(12) United States Patent
Li et al.

(10) Patent No.: US 11,919,419 B2
(45) Date of Patent: Mar. 5, 2024

(54) METHOD AND SYSTEM TO MANAGE THERMAL PROPAGATION IN AN ENERGY STORAGE DEVICE OF A BATTERY ELECTRIC VEHICLE

(71) Applicant: GM GLOBAL TECHNOLOGY OPERATIONS LLC, Detroit, MI (US)

(72) Inventors: Bin Li, Troy, MI (US); Calvin Goodman, Auburn Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 751 days.

(21) Appl. No.: 17/037,937

(22) Filed: Sep. 30, 2020

(65) Prior Publication Data

US 2022/0097562 A1    Mar. 31, 2022

(51) Int. Cl.
*B60L 58/18* (2019.01)
*B60L 15/20* (2006.01)
*B60L 58/26* (2019.01)
*B60Q 9/00* (2006.01)
*H01M 10/42* (2006.01)
(Continued)

(52) U.S. Cl.
CPC ............ *B60L 58/18* (2019.02); *B60L 15/20* (2013.01); *B60L 58/26* (2019.02); *B60Q 9/00* (2013.01); *H01M 10/4257* (2013.01); *H01M 10/613* (2015.04); *H01M 10/625* (2015.04); *H01M 10/633* (2015.04); *H01M 50/20* (2021.01); *H01M 2010/4271* (2013.01); *H01M 2010/4278* (2013.01); *H01M 2220/20* (2013.01)

(58) Field of Classification Search
CPC .. B60L 15/20; B60L 2240/545; B60L 3/0046; B60L 58/18; B60L 58/21; B60L 58/26; B60Q 9/00; H01M 10/4257; H01M 10/482; H01M 10/486; H01M 10/613; H01M 10/625; Y02E 60/10; Y02T 10/70; Y02T 10/72
See application file for complete search history.

(56) References Cited

U.S. PATENT DOCUMENTS 7,746,035 B2 *  6/2010  Yoon .................. H01M 10/486
                                                                      429/61
9,056,556 B1 *  6/2015  Hyde .................... B60L 58/20
(Continued)

FOREIGN PATENT DOCUMENTS

CN    104002684 A    8/2014
CN    107074112 A    8/2017
(Continued)

*Primary Examiner* — Tyler J Lee
(74) *Attorney, Agent, or Firm* — Quinn IP Law

(57) ABSTRACT

A method to manage thermal propagation in an energy storage device of a battery electric vehicle is provided. The method includes operating the battery electric vehicle with a plurality of distinct battery cell module groups each separately providing electrical power to the battery electric vehicle. The method further includes, within a computerized battery cell module groups controller, monitoring conditions within the distinct battery cell module groups, determining occurrence of an abnormal event within one of a plurality of the distinct battery cell module groups based upon the monitored conditions, and controlling operation of the battery electric vehicle based upon the determined occurrence of the abnormal event.

18 Claims, 5 Drawing Sheets

(51) Int. Cl.
*H01M 10/61* (2014.01)
*H01M 10/613* (2014.01)
*H01M 10/625* (2014.01)
*H01M 10/633* (2014.01)
*H01M 50/20* (2021.01)

(56) References Cited

U.S. PATENT DOCUMENTS

| | | | | |
|---|---|---|---|---|
| 9,112,247 | B2* | 8/2015 | Yamauchi | H01M 10/425 |
| 10,498,150 | B2* | 12/2019 | Dulle | H01M 10/4207 |
| 10,647,218 | B1* | 5/2020 | Huang | H01M 10/44 |
| 11,482,850 | B2* | 10/2022 | Miklis | B60L 3/00 |
| 2007/0210752 | A1* | 9/2007 | Yoon | H01M 10/482 |
| | | | | 320/116 |
| 2009/0130538 | A1* | 5/2009 | Kaita | G01R 31/374 |
| | | | | 429/61 |
| 2011/0078470 | A1* | 3/2011 | Wang | H01M 10/482 |
| | | | | 429/150 |
| 2012/0206098 | A1* | 8/2012 | Kim | B60L 53/39 |
| | | | | 320/108 |
| 2013/0006434 | A1* | 1/2013 | Bush | H02J 3/322 |
| | | | | 700/293 |
| 2013/0006677 | A1* | 1/2013 | Anglin | G05B 15/02 |
| | | | | 320/109 |
| 2013/0342310 | A1* | 12/2013 | Park | B60L 53/80 |
| | | | | 701/1 |
| 2015/0147607 | A1* | 5/2015 | Fukuhara | H01M 50/24 |
| | | | | 429/61 |
| 2017/0034278 | A1* | 2/2017 | Kulnick | G08G 1/205 |
| 2017/0276503 | A1* | 9/2017 | Oh | G01C 21/3679 |
| 2019/0092257 | A1 | 3/2019 | Boecker et al. | |
| 2019/0304207 | A1* | 10/2019 | Light-Holets | G08G 1/205 |
| 2020/0036057 | A1* | 1/2020 | Wang | B60L 58/10 |
| 2020/0225288 | A1* | 7/2020 | Park | G01R 31/367 |
| 2020/0284599 | A1* | 9/2020 | Cyr | G01C 21/3469 |

FOREIGN PATENT DOCUMENTS

| | | |
|---|---|---|
| CN | 110770967 A | 2/2020 |
| CN | 111108661 A | 5/2020 |
| DE | 102014101939 A1 | 8/2014 |
| WO | 2018235764 A1 | 12/2019 |

* cited by examiner

FIG. 4
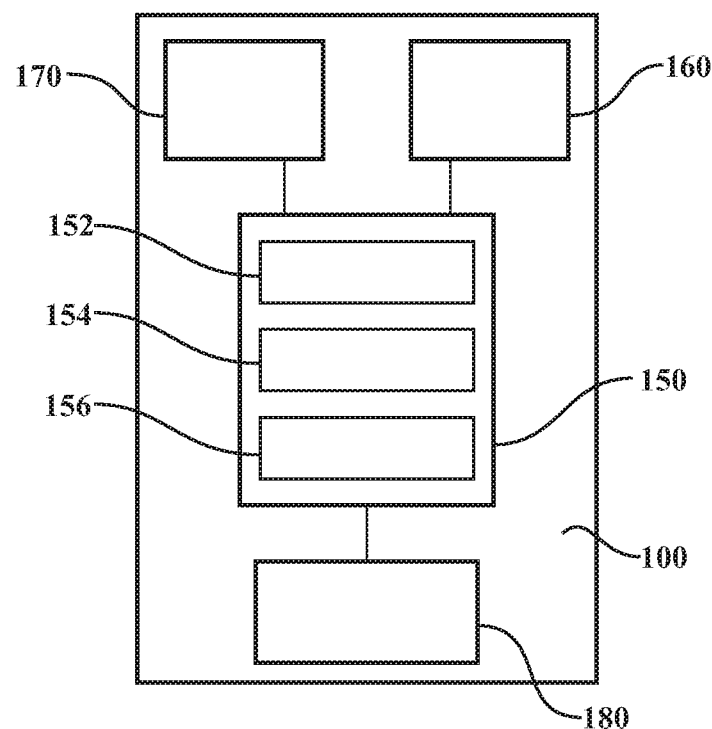
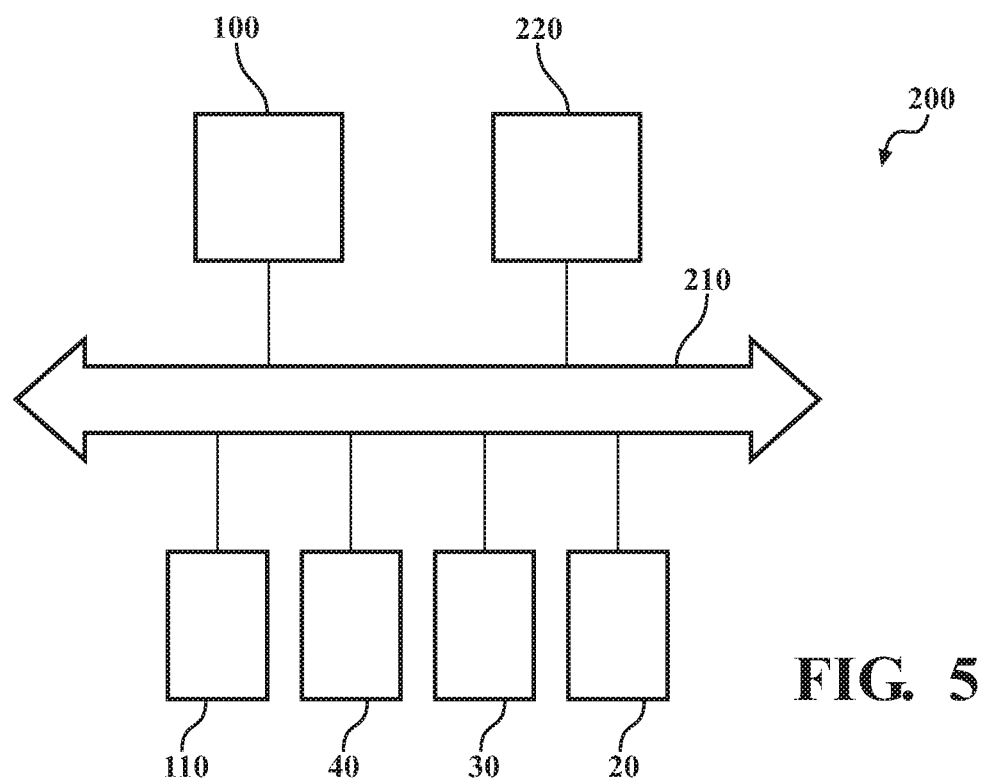
FIG. 5

METHOD AND SYSTEM TO MANAGE THERMAL PROPAGATION IN AN ENERGY STORAGE DEVICE OF A BATTERY ELECTRIC VEHICLE

INTRODUCTION

The disclosure generally relates to a method and system to manage thermal propagation in an energy storage device of a battery electric vehicle.

A battery electric vehicle (BEV) or hybrid electric vehicle (HEV) may include a rechargeable energy storage system (RESS). An RESS may include a battery pack which includes a plurality of battery cells. The plurality of battery cells may be electrically connected to each other in series, with a positive terminal of a first battery cell being connected to a negative terminal of a second battery cell. A positive terminal of the second battery cell may be connected to a negative terminal of a third battery cell. This configuration may repeat, with an overall voltage of the battery pack being a sum of the voltages of all of the battery cells within the battery pack.

SUMMARY

A battery pack including a plurality of unsegregated battery cells connected in series is at risk of thermal propagation between the battery cells. If one of the battery cells overheats or has a thermal event, heat from that one battery cell may progress to battery cells proximate or abutting to the battery cell. Battery cells may include chemicals and construction sensitive to excessive heat, and heat applied to a battery cell may cause a reaction that propagates additional generation of heat. In this way, a thermal event occurring in one battery cell may spread to adjacent battery cells and spread through an entire battery pack. Such an uncontrolled thermal event spreading through an entire battery pack may force the vehicle receiving power from the battery pack to decrease function or stop completely, stranding the vehicle occupants in the middle of a travel route.

A method to manage thermal propagation in an energy storage device of a battery electric vehicle is provided. The method includes operating the battery electric vehicle with a plurality of distinct battery cell module groups each separately providing electrical power to the battery electric vehicle. The method further includes, within a computerized battery cell module groups controller, monitoring conditions within the distinct battery cell module groups, determining occurrence of an abnormal event within one of a plurality of the distinct battery cell module groups based upon the monitored conditions, and controlling operation of the battery electric vehicle based upon the determined occurrence of the abnormal event.

In some embodiments, determining occurrence of the abnormal event includes determining occurrence of one of an open circuit condition, an overtemperature condition, and a thermal event within the one of the distinct battery cell module groups.

In some embodiments, controlling operation of the battery electric vehicle includes controlling operation of a chiller module operable to transfer heat away from the plurality of distinct battery cell module groups.

In some embodiments, controlling operation of the battery electric vehicle includes instructing the battery electric vehicle to pull over.

In some embodiments, controlling operation of the battery electric vehicle includes communicating with emergency personnel over a wireless communications network.

In some embodiments, controlling operation of the battery electric vehicle includes communicating with a computerized remote server device over a wireless communications network.

In some embodiments, controlling operation of the battery electric vehicle includes continuing to operate the battery electric vehicle with constraints based upon loss of operation of the one of the plurality of distinct battery cell module groups.

In some embodiments, controlling operation of the battery electric vehicle includes determining a revised travel route for the battery electric vehicle based upon a loss of operation of one of the plurality of distinct battery cell module groups.

In some embodiments, operating the battery electric vehicle includes operating the battery electric vehicle with one of the plurality of distinct battery cell module groups physically separated from a second of the plurality of distinct battery cell module groups.

In some embodiments, operating the battery electric vehicle includes operating the battery electric vehicle with one of the plurality of distinct battery cell module groups physically distanced from a second of the plurality of distinct battery cell module groups.

In some embodiments, operating the battery electric vehicle includes operating the battery electric vehicle with the plurality of distinct battery cell module groups disposed within a single device in physical contact.

According to one alternative embodiment, a method to manage thermal propagation in an energy storage device of a battery electric vehicle is provided. The method includes operating the battery electric vehicle with a plurality of distinct battery cell module groups each separately providing electrical power to the battery electric vehicle. The method further includes, within a computerized battery cell module groups controller, monitoring conditions within the distinct battery cell module groups, determining occurrence of an abnormal event within one of plurality of the distinct battery cell module groups based upon the monitored conditions, and controlling operation of the battery electric vehicle based upon the determined occurrence of the abnormal event. Determining occurrence of the abnormal event includes determining occurrence of one of an open circuit condition, an overtemperature condition, and a thermal event within the one of the distinct battery cell module groups. Controlling operation of the battery electric vehicle includes controlling operation of a chiller module operable to transfer heat away from the plurality of distinct battery cell module groups.

According to one alternative embodiment, a system to manage thermal propagation in an energy storage device of a battery electric vehicle is provided. The system includes a vehicle propulsion system and a plurality of distinct battery cell module groups each separately providing electrical power to the vehicle propulsion system. The system further includes a computerized battery cell module groups controller. The controller monitors conditions within the distinct battery cell module groups, determines occurrence of an abnormal event within one of a plurality of the distinct battery cell module groups based upon the monitored conditions, and controls operation of the battery electric vehicle based upon the determined occurrence of the abnormal event.

In some embodiments, the computerized battery cell module groups controller determining occurrence of the abnormal event includes determining occurrence of one of an open circuit condition, an overtemperature condition, and a thermal event within the one of the distinct battery cell module groups.

In some embodiments, the computerized battery cell module groups controller controlling operation of the battery electric vehicle includes controlling operation of a chiller module operable to transfer heat away from the plurality of distinct battery cell module groups.

In some embodiments, the computerized battery cell module groups controller controlling operation of the battery electric vehicle includes instructing the battery electric vehicle to pull over.

In some embodiments, the computerized battery cell module groups controller controlling operation of the battery electric vehicle includes continuing to operate the battery electric vehicle with constraints based upon loss of operation of the one of the plurality of distinct battery cell module groups.

In some embodiments, one of the plurality of distinct battery cell module groups is physically separated from a second of the plurality of distinct battery cell module groups.

In some embodiments, one of the plurality of distinct battery cell module groups is physically distanced by an air gap from a second of the plurality of distinct battery cell module groups.

In some embodiments, the plurality of distinct battery cell module groups is disposed within a single device and are in physical contact.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 4 schematically illustrates the computerized battery cell module groups controller of FIG. 3, in accordance with the present disclosure;

FIG. 5 schematically illustrates an exemplary control signal architecture for a vehicle, with components communicating through a communications bus device, in accordance with the present disclosure;

DETAILED DESCRIPTION

Figure 1:
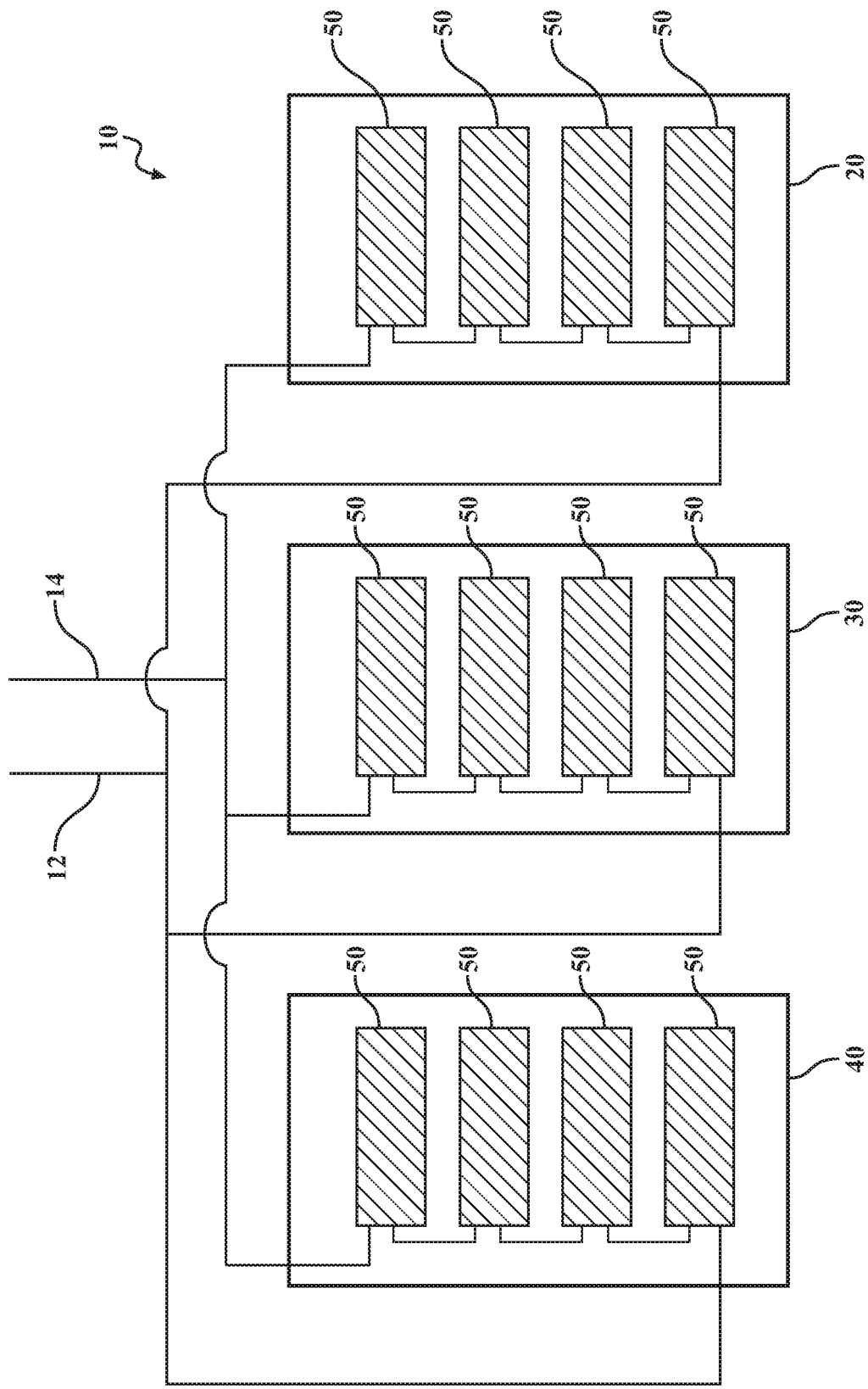
FIG. 1 schematically illustrates an exemplary battery pack including three distinct battery cell module groups, in accordance with the present disclosure.

An RESS including a plurality of battery cells connected in series may suffer a runaway thermal event initiated in one of the battery cells which spreads to neighboring cells. An entire RESS may be disabled within seconds causing the vehicle to become inoperative and/or lose use of active thermal mitigation systems.

A high voltage RESS is provided that allows the system to detect thermal runaway, send alarms to the driver, and maintain high voltage circuit availability. The high voltage RESS further allows the vehicle to continue to drive or pull over to allow safe exit of the vehicle and supports an active chiller system to cool the RESS pack to effectively mitigate thermal runaway events. In one example, a high voltage system may include operation around 400 Volts.

A BEV may include a HEV, a battery powered electric vehicle, or other vehicle that uses a battery to generative motive force.

A method and system to manage thermal propagation in an energy storage device of a BEV is provided. A battery pack may include a plurality of distinct battery cell module groups. These distinct battery cell module groups may each separately provide electrical power to the BEV, and each may be separately or individually disabled and/or disconnected from the BEV, such that a failure in one of the distinct battery cell module groups does not disable electrical power in the BEV. Mitigation may be performed, such as modulating control of an active cooling system which may cool a failing or malfunctioning distinct battery cell module group. Operation of the BEV may be ceased in a controlled manner or maintained with restrictions based upon deactivation of a portion of the distinct battery cell module groups. An alert may be generated to the operator of the vehicle, authorities, or other parties based upon, for example, a failure of a distinct battery cell module group indicating a runaway thermal event occurring.

A plurality of distinct battery cell module groups may include a plurality of battery cells co-located within a single device, wherein the battery cells of the plurality of groups are located together without physical separation or disposed within a single device without separation or in physical contact with each other. In such an embodiment, the wiring of the various cells may be able to separately provide power from and/or individual disconnect of the various groups of battery cells identified in each distinct battery cell module group even though the battery cells are physically located in one device.

In another embodiment, a plurality of distinct battery cell module groups may be physically separated from each other, for example, to prevent heat generated in one distinct battery cell module group from being conducted to a neighboring distinct battery cell module group. In one embodiment, a physical wall or insulating barrier could be placed between one distinct battery cell module group and a next distinct battery cell module group. In another embodiment, physical distance or an air gap may be provided between one distinct battery cell module group and a next distinct battery cell module group.

FIG. 1 schematically illustrates an exemplary battery pack 10 including a first distinct battery cell module group 20, a second distinct battery cell module group 30, and a third distinct battery cell module group 40. Each of the first distinct battery cell module group 20, the second distinct battery cell module group 30, and the third distinct battery cell module group 40 include a plurality of battery cells 50 connected in series to the other battery cells of that battery cell group module. Three battery cell group modules are illustrated in FIG. 1. Different numbers of battery cell group modules may be employed in accordance with the disclosure. Each battery cell group module may include differing numbers of battery cells 50. Each battery cell group module may include the same number of battery cells 50, or each battery cell group module may include a different number of battery cells 50. One battery cell 50 may include the same properties as other battery cells 50 or may include different properties as compared to other battery cells 50.

The second distinct battery cell module group 30 is disposed between but separated from both the first distinct battery cell module group 20 and the third distinct battery cell module group 40. Separation may be achieved by physical distance including an air gap. Separation may be additionally or alternatively achieved by a wall including insulating materials configured to prevent substantial heat transfer from one battery cell module group to another battery cell module group. Separation of the battery cell module groups from each other is effective to prevent significant heat transfer from one battery cell module group to the next.

A positive terminal 12 for the battery pack 10 is illustrated. A negative terminal 14 for the battery pack 10 is additionally illustrated. The illustrated battery pack 10 includes the first distinct battery cell module group 20, the second distinct battery cell module group 30, and the third distinct battery cell module group 40 connected in parallel to each provide electrical charge to the positive terminal 12 and the negative terminal 14. Parallel connection of the battery cell module groups may be advantageous, in that if one of the battery cell module groups becomes inoperable or needs to be shut down, the defective battery cell module group may be isolated and/or deactivated without affecting operation of the other two battery cell module groups. Connected in parallel, each of the first distinct battery cell module group 20, the second distinct battery cell module group 30, and the third distinct battery cell module group 40 may be configured to each provide electrical power at a common voltage, for example, 400 Volts. If one battery cell module group is deactivated, the other two battery cell module groups may continue to provide power at the desired voltage, although with reduced current capacity as compared to the battery pack 10 with the three battery cell module groups activated.

Figure 2:
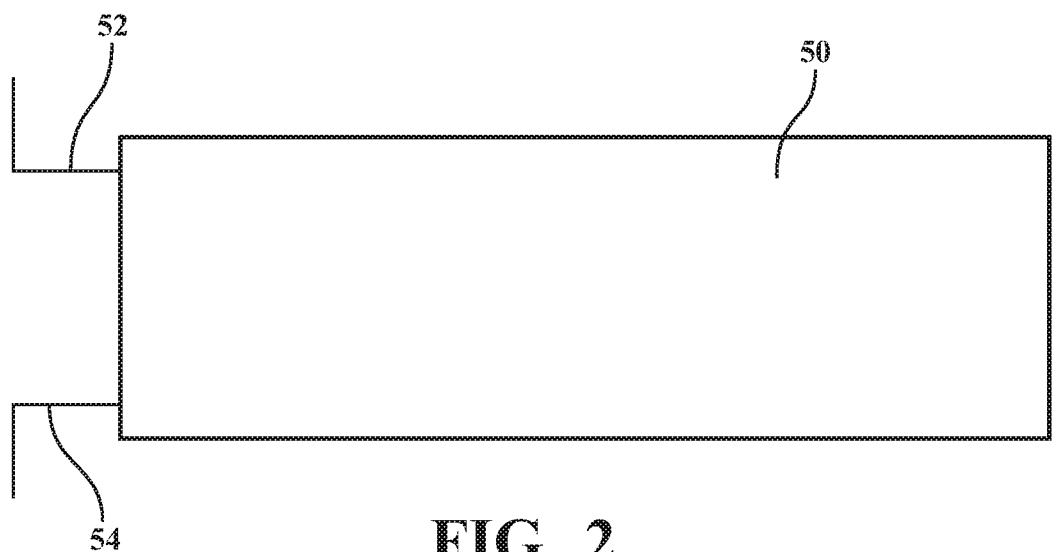
FIG. 2 schematically illustrates one battery cell of FIG. 1, in accordance with the present disclosure.

FIG. 2 schematically illustrates one battery cell 50 of FIG. 1. The battery cell 50 is illustrated including an exemplary rectangular body section. Within the rectangular body section, the battery cell 50 includes an anode, a cathode, and an electrolyte bridging the anode and the cathode. In one embodiment, the battery cell 50 may be a lithium ion battery cell. The battery cell 50 includes a positive terminal 52 and a negative terminal 54. Positive terminal 52 may include an electrical connection that connects to a negative terminal 54 of a neighboring battery cell 50. Alternatively, positive terminal 52 may include a connection to devices or circuitry outside of the battery cell group module or the battery pack, for example, providing a positive terminal for the battery cell group module.

Figure 3:
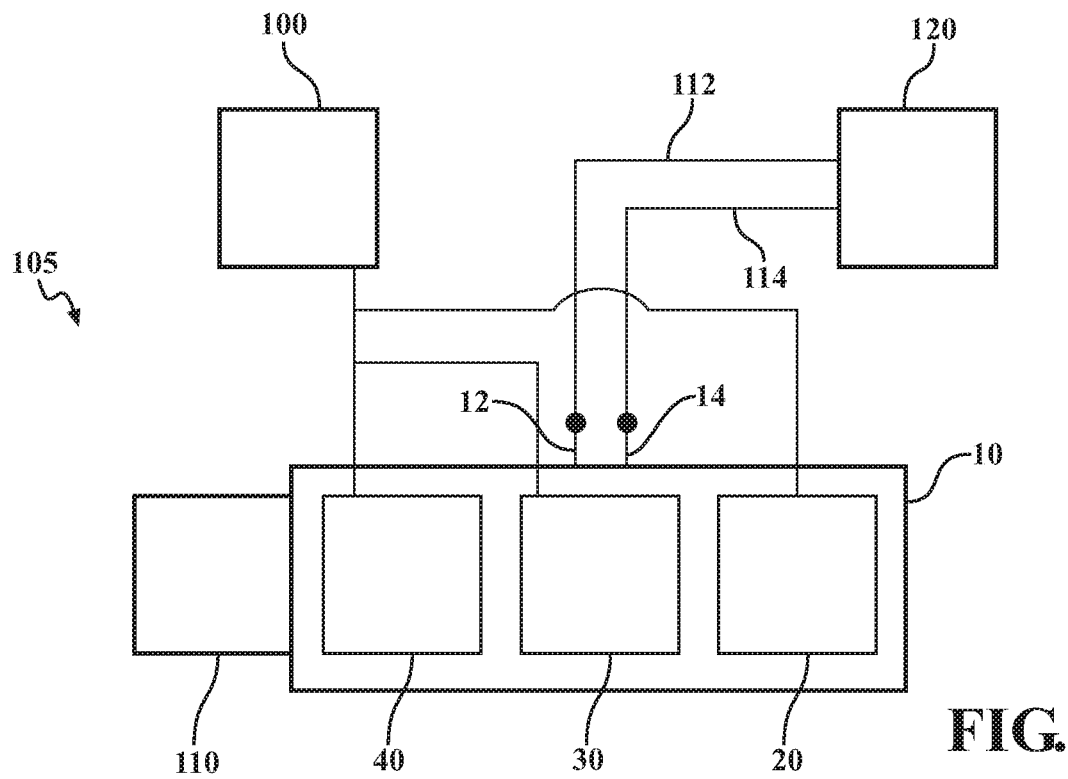
FIG. 3 schematically illustrates the battery pack of FIG. 1 within a vehicle electrical system including a vehicle propulsion system receiving power from the battery pack and a computerized battery cell module groups controller, in accordance with the present disclosure.

FIG. 3 schematically illustrates the battery pack 10 of FIG. 1 within a vehicle electrical system 105 including a vehicle propulsion system 120 receiving power from the battery pack 10 and a computerized battery cell module groups controller 100. The battery pack 10 is illustrates including the first distinct battery cell module group 20, the second distinct battery cell module group 30, and the third distinct battery cell module group 40. The battery pack 10 is further illustrated including a chiller module 110 operable to provide cooling to one or more of the battery cell module groups. Chiller module 110 may include a device useful to transfer heat away from a battery cell or group of battery cells. In one embodiment, the chiller module 110 controls a flow of coolant to each of the battery cell module groups. The coolant flows through a heat exchanger connected to the battery cell module groups and receives a flow of heat from the battery cell module groups, thereby cooling the battery cell module groups. In another embodiment, the chiller module 110 may employ another method of heat transfer, for example, with a solid-state chill plate being connected to the battery cell module groups. In one embodiment, chiller module 110 may operate in a reverse mode, for example, providing heat to the battery cell module groups during a cold system start. In one embodiment, the chiller module 110 may independently control heat transfer from each battery call group module according to temperature sensors located on or within each of the battery cell module groups.

The vehicle propulsion system 120 illustrated is operable to convert power from the battery pack 10 to motive power for the vehicle. In one embodiment, the vehicle propulsion system 120 may be operable in a regenerative mode, recovering electrical energy from a slowing vehicle as electrical power to be stored by the battery pack 10. An electrical connection 112 is illustrated connecting the vehicle propulsion system 120 to the positive terminal 12 of the battery pack 10. An electrical connection 114 is illustrated connecting the vehicle propulsion system 120 to the negative terminal 14 of the battery pack 10. The vehicle propulsion system 120 may include a power inverter and one or more electrical machines.

The computerized battery cell module groups controller 100 is illustrated connected to each of the first distinct battery cell module group 20, the second distinct battery cell module group 30, and the third distinct battery cell module group 40. The computerized battery cell module groups controller 100 is operable to monitor operation and/or temperatures of each of the battery cell module groups. The computerized battery cell module groups controller 100 is further operable to command isolation and/or activation of one of the battery cell module groups in case of a detected overtemperature condition or thermal event.

FIG. 4 schematically illustrates the computerized battery cell module groups controller 100 of FIG. 3. The computerized battery cell module groups controller 100 includes a computerized processing device 150, a communications device 160, an input output coordination device 170, and a memory storage device 180. It is noted that the computerized battery cell module groups controller 100 may include other components and some of the components are not present in some embodiments.

The processing device 150 may include memory, e.g., read only memory (ROM) and random-access memory (RAM), storing processor-executable instructions and one or more processors that execute the processor-executable instructions. In embodiments where the processing device 150 includes two or more processors, the processors may operate in a parallel or distributed manner. The processing device 150 may execute the operating system of the battery cell module groups controller 100. Processing device 150 may include one or more modules executing programmed code or computerized processes or methods including executable steps. Illustrated modules may include a single physical device or functionality spanning multiple physical devices. In the illustrative embodiment, the processing device 150 also includes a battery cell module group evaluation module 152, a chiller control module 154, and an abnormal event reaction module 156, which are described in greater detail below.

The communications device 160 may include a communications/data connection with a bus device configured to transfer data to different components of the system and may include one or more wireless transceivers for performing wireless communication.

The input output coordination device 170 includes hardware and/or software configured to enable the processing device 150 to receive and/or exchange data with on-board sensors of the host vehicle and to provide control of switches, modules, and processes throughout the vehicle based upon determinations made within processing device 150.

The memory storage device 180 is a device that stores data generated or received by the battery cell module groups controller 100. The memory storage device 180 may include, but is not limited to, a hard disc drive, an optical disc drive, and/or a flash memory drive.

The battery cell module group evaluation module 152 may include programming operable to monitor readings from temperature sensors located on or within the battery cell module groups. The battery cell module group evaluation module 152 may compare the readings from the temperature sensors to fixed threshold values. The battery cell module group evaluation module 152 may additionally or alternatively be programmed with dynamic temperature ranges which the battery cell module groups should operate. The battery cell module group evaluation module 152 may include time-based limits, for example, diagnosing whether a battery cell module group is over a threshold temperature for more than a selected time period. Based upon comparison of the readings from the temperature sensors to the programmed thresholds, the battery cell module group evaluation module 152 may determine occurrence of an abnormal event within one of the battery cell module groups, such as an overtemperature condition or a thermal event. The battery cell module group evaluation module 152 may further monitor voltage conditions within each of the battery cell module groups and include programming to evaluate whether one or more of the battery cell module groups are in an open circuit condition.

The chiller control module 154 may include programming operable to control operation of the chiller module 110 of FIG. 3. Operation of the chiller module 110 may include a moderate or non-maximum coolant flow control during typical operation of the battery pack 10. Operation of the chiller module 110 may additionally or alternatively include control of the chiller module 110 in reaction to a determined overtemperature condition or thermal event, for example, increasing a flow of coolant to a maximum flow to an overtemperature battery cell module group.

The abnormal event reaction module 156 may include programming operable to control operation of the plurality of battery cell module groups based upon a determined overtemperature condition or thermal event. Battery pack 10 may include electrical switches each operable to isolate or disconnect one of the battery cell module groups from the rest of the system. The abnormal event reaction module 156 may include programming to command those switches to open or close, thereby controlling isolation or connection of each of the battery cell module groups to the rest of the vehicular system. In one embodiment, the abnormal event reaction module 156 may include programming to determine whether the vehicle may be stopped, whether operation may be maintained at levels typical to full operation of the vehicle, or whether operation may be maintained with reduced operational restraints in response to an overtemperature condition or thermal event. In one embodiment, the abnormal event reaction module 156 may estimate how much current the remaining active battery cell module groups may deliver and control operation of the vehicle accordingly. The abnormal event reaction module 156 may alert the driver or operator of the vehicle to vehicle conditions and/or may communicate vehicle conditions to a remote server device. Such a remote server device may include programming to contact emergency personnel, may include a communication to an emergency contact designated by the operator, or may include programming to determine next steps such as determining traffic conditions along nearby roads to plot a revised travel path for the vehicle operating under reduced operational constraints. Automatically contacting a remote server device may generate an alert to emergency personnel in a brief time prior to the electrical system of the BEV shutting down. In another embodiment, communication with a remote server device may include communication with a home security system capable of communicating wirelessly with members of a household. Such a system may, for example, alert parents if a vehicle driven by a son or daughter experiences failure of one or more distinct battery cell module groups.

The computerized battery cell module groups controller 100 is provided as an exemplary computerized device capable of executing programmed code to operate the disclosed process. A number of different embodiments of the battery cell module groups controller 100 and modules operable therein are envisioned, and the disclosure is not intended to be limited to examples provided herein.

FIG. 5 schematically illustrates an exemplary control signal architecture 200 for a vehicle, with components communicating through a communications bus device 210. The communications bus device 210 is illustrated in electronic communication with the computerized battery cell module groups controller 100, a computerized vehicle propulsion system controller 220, the chiller module 110, the first distinct battery cell module group 20, the second distinct battery cell module group 30, and the third distinct battery cell module group 40. Data, command signals, and other electronic signals may be communicated between the various devices and modules attached to the communications bus device 210. In one exemplary embodiment, the computerized battery cell module groups controller 100 may communicate constraints to the computerized vehicle propulsion system controller 220 based upon deactivation of one or more battery cell module groups and corresponding reduced current available from the battery pack 10.

Figure 6:
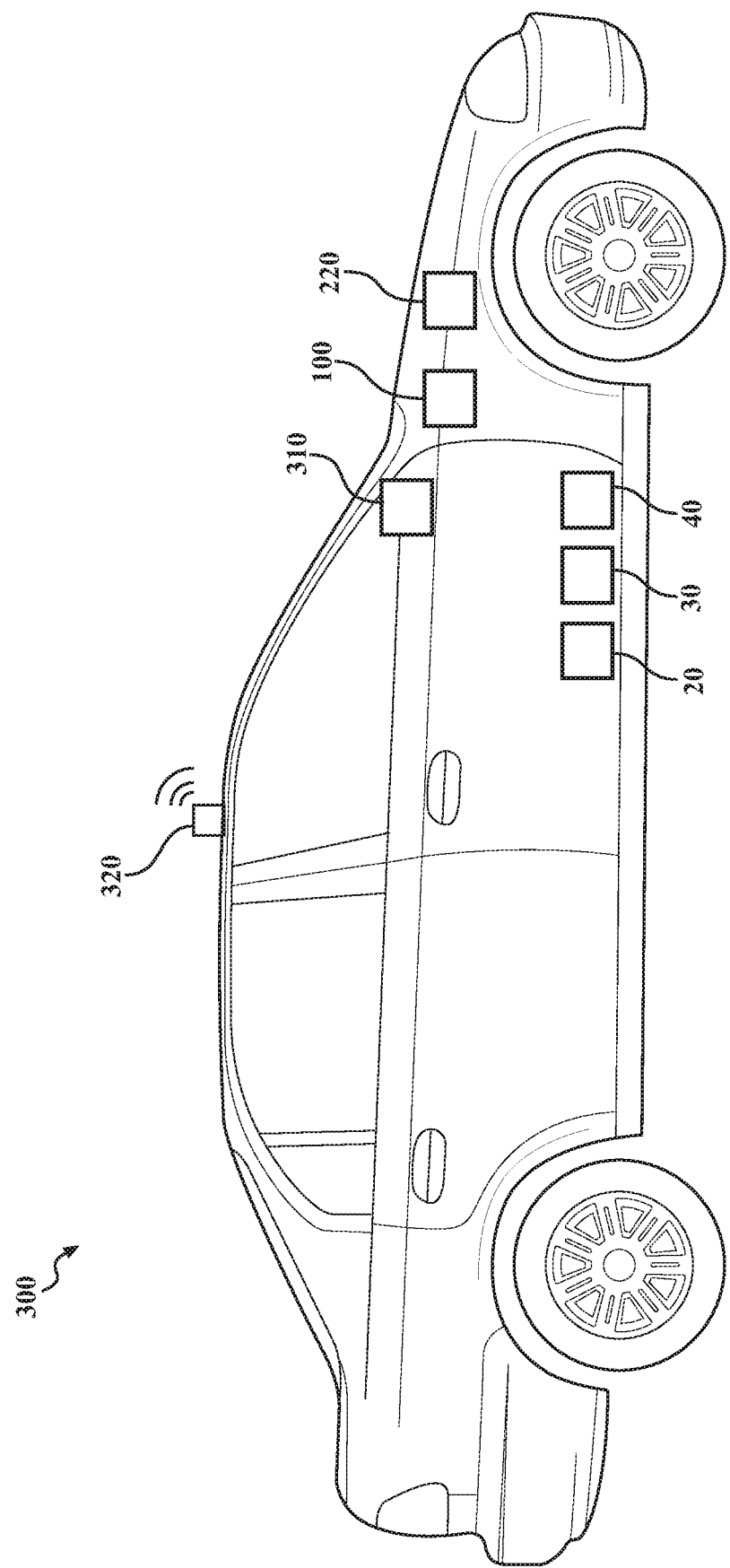
FIG. 6 schematically illustrates in side view a vehicle equipped with distinct battery cell module groups of FIG. 1, in accordance with the present disclosure.

FIG. 6 schematically illustrates in side view a vehicle 300 equipped with the battery cell module groups of FIG. 1. The vehicle 300 is illustrated including the first distinct battery cell module group 20, the second distinct battery cell module group 30, and the third distinct battery cell module group 40. The vehicle 300 is further illustrated including the computerized battery cell module groups controller 100, a computerized vehicle propulsion system controller 220, and a telematics module 310. The telematics module 310 is operable to provide information to and receive input from an operator of the vehicle. Vehicle communications device 320 is illustrated providing wireless communication between the vehicle and a remote communications network. In one embodiment, the computerized battery cell module groups controller 100 may provide the telematics module 310 with system data, and the operator may be given choices for operation of the vehicle through the telematics module 310, such as selecting between a lower operating speed of the vehicle and deactivation of a heating system in the passenger compartment in response to a battery cell module group being deactivated in accordance with the disclosure.

Figure 7:
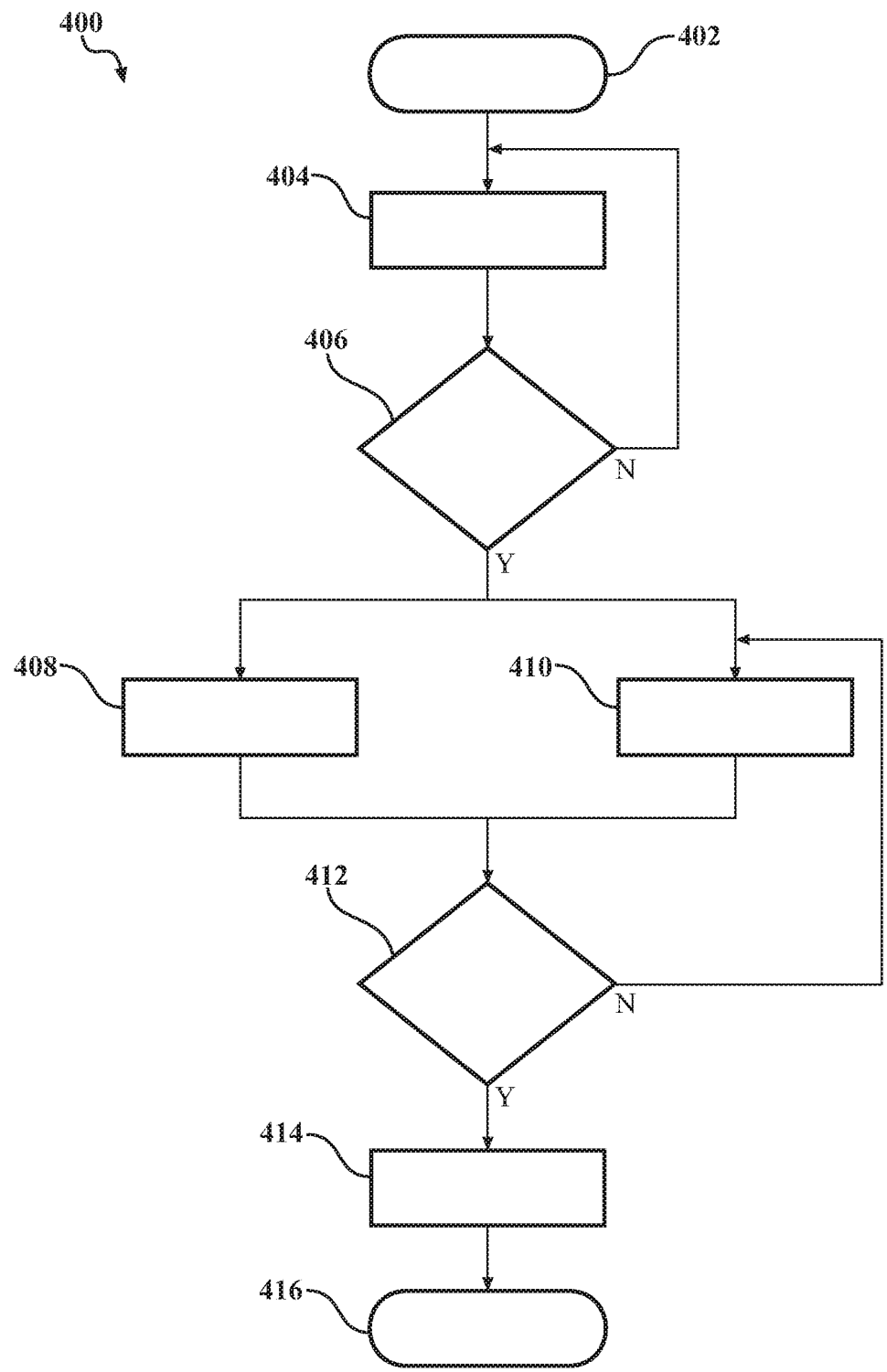
FIG. 7 is a flowchart illustrating an exemplary method to utilize a battery pack including a plurality of distinct battery cell module groups, in accordance with the present disclosure.

FIG. 7 is a flowchart illustrating an exemplary method 400 to utilize a battery pack including a plurality of distinct battery cell module groups. The method 400 starts at step 402. At step 402, operation of the plurality of distinct battery cell module groups are monitored and compared to threshold values. In one embodiment, the battery cell module groups are monitored to determine whether one of the battery cell module groups is in an open circuit condition. In another embodiment, the battery cell module groups are monitored to determine whether one is in an overtemperature condition or if a thermal event has occurred. At step 404, a determination is made whether an abnormal event has been diagnosed in one of the battery cell module groups. Such an abnormal event may include a detected open circuit condition, an overtemperature condition, or a detected thermal event. If no such abnormal event is determined to have occurred, the method returns to step 404, where the battery cell module groups are monitored. If an abnormal event is determined to have occurred, the method advances to steps 408 and 410. At step 408, an alarm or alert is provided to the operator of the vehicle. Such an alert may include an instruction to immediately pull the vehicle over to the side of the road and safely exit the vehicle. At step 410, active thermal management may be employed, for example, including directed operation of a chiller module and/or other system to bring a thermal event under control. At step 412, a determination is made whether a second abnormal event in a second battery cell module group is indicated. If no second abnormal event is determined, the method returns to step 410, where the active thermal management continues to operate. In the event that step 410 continues for some time period to determine that no second abnormal event has occurred, an optional method may be employed to determine that the thermal event has been controlled and that the vehicle may continue on with remaining battery cell module groups active. If a second abnormal event is determined, the method advances to step 414 where a runaway thermal event is diagnosed, and corresponding actions are commanded such as maximum level active thermal management and wireless communications with emergency personnel. At step 416, the method 400 ends. The method 400 is provided as an exemplary method to operate and utilize a battery pack including a plurality of distinct battery cell module groups. A number of variations are envisioned, and the disclosure is not intended to be limited to the examples provided.

While the best modes for carrying out the disclosure have been described in detail, those familiar with the art to which this disclosure relates will recognize various alternative designs and embodiments for practicing the disclosure within the scope of the appended claims.

What is claimed is:

1. A method to manage thermal propagation in an energy storage device of a battery electric vehicle, the method comprising:
    operating the battery electric vehicle with a plurality of distinct battery cell module groups each separately providing electrical power to the battery electric vehicle;
    operating the battery electric vehicle with a vehicle propulsion system operable to convert power from the plurality of distinct battery cell module groups to provide motive power for the battery electric vehicle; and
    within a computerized battery cell module groups controller,
        monitoring conditions within the plurality of distinct battery cell module groups;
        determining occurrence of an abnormal event within one of the plurality of distinct battery cell module groups based upon the monitored conditions; and
        controlling operation of the battery electric vehicle by operating a chiller module in cooling mode to transfer heat away from the plurality of distinct battery cell module groups during occurrence of the abnormal event; and
        controlling operation of the battery electric vehicle by operating the chiller module in reverse mode to provide heat to the plurality of distinct battery cell module groups during a cold start of the battery electric vehicle when the abnormal event is not occurring, the vehicle propulsion system is not providing motive power for the battery electric vehicle, and the battery electric vehicle is stationary.

2. The method of claim 1, wherein determining the occurrence of the abnormal event includes determining occurrence of one of an open circuit condition, an overtemperature condition, and a thermal event within the one of the plurality of distinct battery cell module groups.

3. The method of claim 2, wherein controlling the operation of the battery electric vehicle includes instructing the battery electric vehicle to pull over.

4. The method of claim 2, wherein controlling the operation of the battery electric vehicle includes communicating with emergency personnel over a wireless communications network.

5. The method of claim 1, wherein controlling the operation of the battery electric vehicle includes communicating with a computerized remote server device over a wireless communications network.

6. The method of claim 2, wherein controlling the operation of the battery electric vehicle includes continuing to operate the battery electric vehicle with constraints based upon loss of operation of the one of the plurality of distinct battery cell module groups.

7. The method of claim 6, wherein controlling the operation of the battery electric vehicle includes determining a revised travel route for the battery electric vehicle based upon a loss of operation of one of the plurality of distinct battery cell module groups.

8. The method of claim 1, wherein operating the battery electric vehicle includes operating the battery electric vehicle with one of the plurality of distinct battery cell module groups physically separated from a second of the plurality of distinct battery cell module groups.

9. The method of claim 1, wherein operating the battery electric vehicle includes operating the battery electric vehicle with one of the plurality of distinct battery cell module groups physically distanced from a second of the plurality of distinct battery cell module groups.

10. The method of claim 1, wherein operating the battery electric vehicle includes operating the battery electric vehicle with the plurality of distinct battery cell module groups disposed within a single device in physical contact.

11. A method to manage thermal propagation in an energy storage device of a battery electric vehicle, the method comprising:
    operating the battery electric vehicle with a plurality of distinct battery cell module groups each separately providing electrical power to the battery electric vehicle;
    operating the battery electric vehicle with a vehicle propulsion system operable to convert power from the plurality of distinct battery cell module groups to provide motive power for the battery electric vehicle; and within a computerized battery cell module groups controller,
  monitoring conditions within the plurality of distinct battery cell module groups;
  determining occurrence of an abnormal event within one of the plurality of distinct battery cell module groups based upon the monitored conditions, wherein the determining occurrence of the abnormal event includes determining occurrence of one of an open circuit condition, an overtemperature condition, and a thermal event within the one of the plurality of distinct battery cell module groups;
  controlling operation of the battery electric vehicle based upon the determined occurrence of the abnormal event, wherein controlling the operation of the battery electric vehicle includes operating a chiller module in cooling mode to transfer heat away from the plurality of distinct battery cell module groups; and
  controlling operation of the battery electric vehicle by operating the chiller module in reverse mode to provide heat to the plurality of distinct battery cell module groups during a cold start of the battery electric vehicle when the abnormal event is not occurring, the vehicle propulsion system is not providing motive power for the battery electric vehicle, and the battery electric vehicle is stationary.

12. A system to manage thermal propagation in an energy storage device of a battery electric vehicle, the method comprising:
  a plurality of distinct battery cell module groups each separately providing electrical power to the vehicle propulsion system;
  a vehicle propulsion system operable to convert power from the plurality of distinct battery cell module groups to provide motive power for the battery electric vehicle;
  a chiller module operable in cooling mode to transfer heat away from the plurality of distinct battery cell module groups and alternately operable in reverse mode to provide heat to the plurality of distinct battery cell module groups; and
  a computerized battery cell module groups controller operative to,
    monitor conditions within the plurality of distinct battery cell module groups;
    determine occurrence of an abnormal event within one of the plurality of distinct battery cell module groups based upon the monitored conditions;
    control operation of the battery electric vehicle based upon the determined occurrence of the abnormal event; and
    operate the chiller module in cooling mode to transfer heat away from the plurality of distinct battery cell module groups during occurrence of the abnormal event and operate the chiller module in reverse mode to provide heat to the plurality of distinct battery cell module groups during a cold start of the battery electric vehicle when the abnormal event is not occurring, the vehicle propulsion system is not providing motive power for the battery electric vehicle, and the battery electric vehicle is stationary.

13. The system of claim 12, wherein determining the occurrence of the abnormal event includes determining occurrence of one of an open circuit condition, an overtemperature condition, and a thermal event within the one of the plurality of distinct battery cell module groups.

14. The system of claim 12, wherein controlling the operation of the battery electric vehicle includes instructing the battery electric vehicle to pull over during occurrence of the abnormal event.

15. The system of claim 12, wherein controlling the operation of the battery electric vehicle includes continuing to operate the battery electric vehicle with constraints based upon loss of operation of the one of the plurality of distinct battery cell module groups during occurrence of the abnormal event.

16. The system of claim 12, wherein one of the plurality of distinct battery cell module groups is physically separated from a second of the plurality of distinct battery cell module groups.

17. The system of claim 16, wherein one of the plurality of distinct battery cell module groups is physically distanced by an air gap from a second of the plurality of distinct battery cell module groups.

18. The system of claim 17, wherein the plurality of distinct battery cell module groups are disposed within a single device and are in physical contact.

* * * * *